United States Patent
Lindroos et al.

(10) Patent No.: US 7,731,777 B2
(45) Date of Patent: Jun. 8, 2010

(54) METHOD FOR PROCESSING ANODE SLUDGE

(75) Inventors: Leo Lindroos, Pori (FI); Henri Virtanen, Pori (FI); Olli Järvinen, Espoo (FI)

(73) Assignee: Outotec Oyj, Espoo (FI)

( * ) Notice: Subject to any disclaimer, the term of this patent is extended or adjusted under 35 U.S.C. 154(b) by 300 days.

(21) Appl. No.: 10/572,104

(22) PCT Filed: Aug. 31, 2004

(86) PCT No.: PCT/FI2004/000505

§ 371 (c)(1),
(2), (4) Date: Mar. 15, 2006

(87) PCT Pub. No.: WO2005/028686

PCT Pub. Date: Mar. 31, 2005

(65) Prior Publication Data

US 2007/0062335 A1 Mar. 22, 2007

(30) Foreign Application Priority Data

Sep. 23, 2003 (FI) .................................. 20031366

(51) Int. Cl.
*C22B 7/00* (2006.01)
*C22B 15/00* (2006.01)
*C22B 1/06* (2006.01)

(52) U.S. Cl. ............................ 75/418; 75/714; 423/22; 423/27

(58) Field of Classification Search ............ 75/418, 75/714; 423/22, 27–41
See application file for complete search history.

(56) References Cited

U.S. PATENT DOCUMENTS

| 2,039,256 A | * | 4/1936 | Martin et al. ................. 75/418 |
| 3,944,414 A | | 3/1976 | Yanagida et al. |
| 4,002,544 A | | 1/1977 | Heimala et al. |
| 4,047,939 A | | 9/1977 | Morrison |
| 4,094,668 A | | 6/1978 | Yannopoulos et al. |
| 4,389,248 A | * | 6/1983 | Iio et al. ....................... 75/418 |

(Continued)

FOREIGN PATENT DOCUMENTS

JP            59104439            6/1984

(Continued)

OTHER PUBLICATIONS

O. Hyvarinen et al, Selenium and precious metals recovery from copper anode slimes at Outokumpu Pori Refinery, in Precious Metals: Mining, Extraction and Processing, 1984, p. 537-548.*

(Continued)

*Primary Examiner*—George Wyszomierski
*Assistant Examiner*—Mark L Shevin
(74) *Attorney, Agent, or Firm*—Chernoff, Vilhauer, McClung & Stenzel, LLP

(57) ABSTRACT

The invention relates to a hydrometallurgical method for separating the precious metals and impurities of anode sludge obtained from copper electrolysis. According to the method, anode sludge copper is separated in atmospheric leaching; calcinated in two steps for separating selenium and for sulfatizing silver; the sulfatized silver is separated by leaching into a neutral aqueous solution, from which it can be separated by reduction or by extraction.

24 Claims, 1 Drawing Sheet

Figure 1:
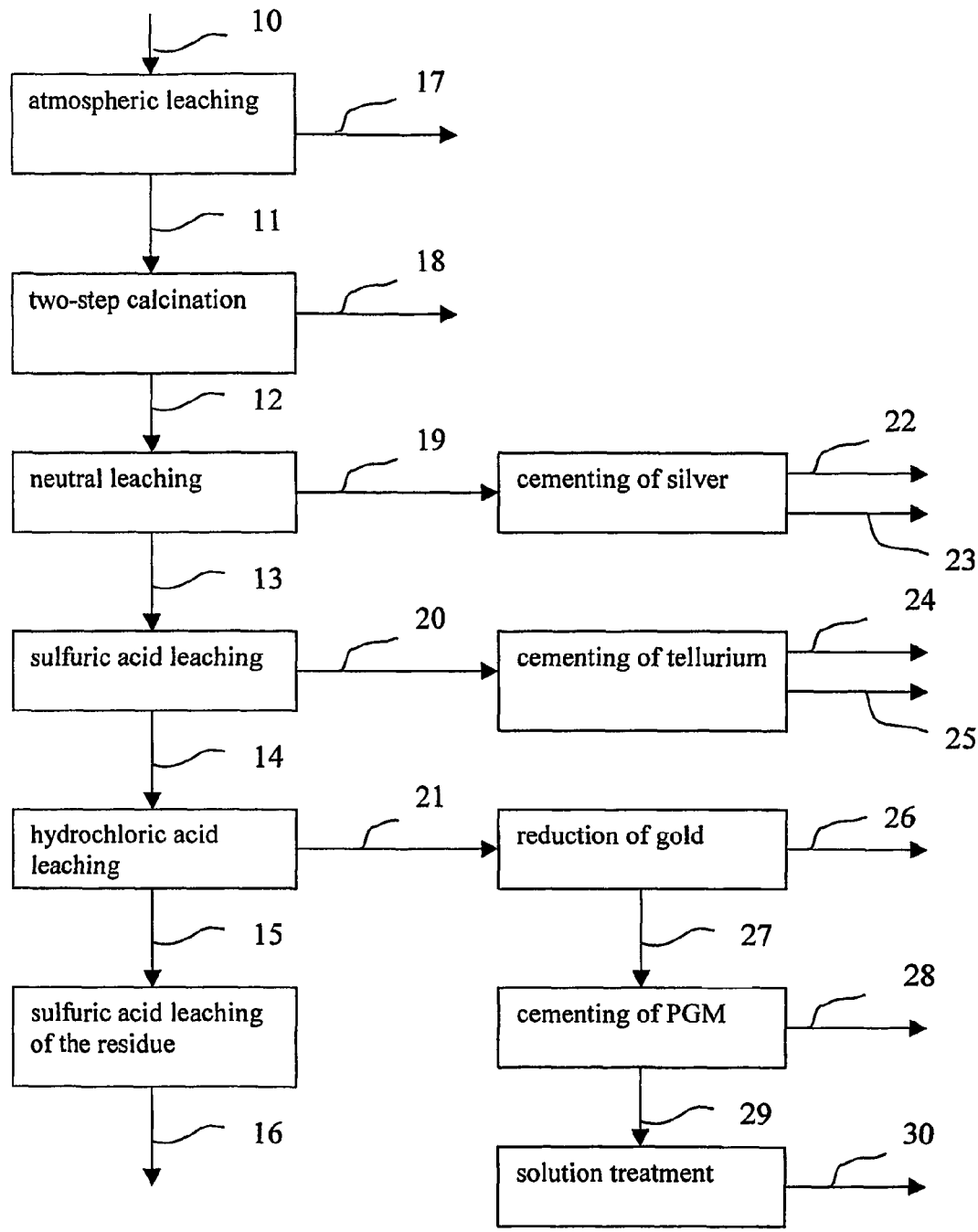

U.S. PATENT DOCUMENTS 4,473,396 A * 9/1984 Hyvarinen et al. .......... 423/508

FOREIGN PATENT DOCUMENTS

| JP | 10280059 | 10/1998 |
| WO | WO 01/083835 A2 * | 11/2001 |

OTHER PUBLICATIONS

J. Hait et al. Some studies on sulfuric acid leaching of anode slime with additives. Ind. Eng. Chem. Res. vol. 41, Nov. 13, 2002, p. 6593-6599.*

M.H.H. Mahmoud, Leaching platinum-group metals in a sulfuric acid/chloride solution. Journal of Metals, Apr. 2003, p. 37-40.*

* cited by examiner

METHOD FOR PROCESSING ANODE SLUDGE

This is a national stage application filed under 35 USC 371 based on International Application No. PCT/FI2004/000505 filed Aug. 31, 2004, and claims priority under 35 USC 119 of Finnish Patent Application No. 20031366filed Sep. 23, 2003.

The invention relates to a hydrometallurgical method according to the preamble of the independent claim for processing anode sludge obtained from copper electrolysis.

In copper electrolysis, the non-soluble ingredients of the anodes sink as anode sludge to the bottom of the elecorolytic tank, from where it is recovered when the anodes are replaced. In addition to copper and nickel, anode sludge also contains metals more valuable than copper, such as tellurium, selenium, gold, silver and platinum metals, and as impurities arsenic, sulfur, antimony, bismuth and lead. Valuable metals and impurities are separated in the processing of anode sludge.

In known anode sludge treatment processes, copper and nickel are usually first removed from the sludge, then silver, whereafter there is separated gold, and separately platinum metals. Selenium is generally separated after copper and nickel.

The separation of copper and nickel can be based on leaching at a high pressure and temperature in the presence of sulfuric acid and oxygen, in which case copper, nickel and tellurium are dissolved. When applying Doré smelting in the separation of valuable metals, it is important that a maximum share of the anode sludge copper is separated before the Doré step.

Selenium can be removed by calcinating the sludge obtained in the filtering after copper removal at the temperature of 435-450° C. In most copper refining plants, the separation of valuable metals remaining in the sludge is based on pyrometallurgical Doré smelting. Doré smelting is a multi-step process, usually including the following steps: smelting of the anode sludge refined from copper, reduction of the sludge, removal of primary sludge, oxidation of Doré matte, removal of secondary sludge and anode casting. As regards the application of the Dorémethod on an industrial scale, restrictions are set by environmental and safety regulations that are becoming stricter all the time. Among the weaknesses of the method, let us point out for instance that it has several steps, it is long and expensive, and that in the process, there are created harmful residues, dust and gases, which are difficult to process further. Problems are especially caused by the slag created in the smelting process, in which slag a large share of the anode sludge impurities are removed.

For replacing the Doré method, there are developed several hydrometallurgical methods where valuable metals are leached into aqueous or acidic solutions for separating them. The purpose of said processes is to reduce the harmful effects of a pyrometallurgical process to the environment, to improve the recovery of valuable metals and to prevent the recirculation of impurity metals back to copper smelting.

Known hydrometallurgical methods for separating the valuable metals of anode sludge are based on the use of nitrogen acid, because the solubility of silver as nitrate is high. However, hydrometallurgical processes based on the use of nitrates for treating anode sludge are not compatible with the rest of the electrolytic process, because the electrolytic refining of copper is carried out in a sulfate solution. In addition, the nitrate bearing sludge must be mechanically ground finer, in order to make the leaching successful.

From the publication Hoffman et al.: Proceedings Copper 95, International Conference Vol. III, 1995, pp. 41-57, there is known a method for processing anode sludge obtained from copper electrolysis. In said method, the copper and tellurium of the sludge are first leached in an autoclave at a high pressure and temperature. After pressure leaching, the sludge is further leached into hydrochloric acid by using chloride gas or hydrogen peroxide as the oxidant. Gold is separated by extraction from the obtained solution. After separating gold, the selenium contained in the solution is reduced by $SO_2$ gas. In this process step, also tellurium, gold residues and platinum metals are alloyed. Selenium is distilled from the obtained, valuable metals bearing precipitate, and the distilling residue is returned to the process or processed outside the plant. The leaching residue from wet chlorination is processed further for recovering the lead and silver contained therein. After lead separation, the silver chloride from the precipitate is leached into an ammonia solution, reprecipitated as pure chloride and finally reduced into metallic silver.

In the publication Hoffman et al.: Hydrometallurgy 94, 1994, pp. 69-107, there is introduced a method for processing anode sludge obtained from copper electrolysis. According to said method, copper and nickel are separated from anode sludge in an autoclave, at a high pressure and temperature. Then selenium is calcinated, and the metals are sulfatized in a calcination furnace. The obtained silver sulfate is converted into nitrate in a ball mill by means of calcium nitrate. Finally silver is separated electrolytically.

The object of the present invention is to realize a novel arrangement, based on a hydrometallurgical process, for processing anode sludge and for separating the valuable metals and impurities contained therein. A particular object of the invention is to improve the recovery of valuable metals and to enhance the separation of impurities, as well as to reduce the processing expenses of anode sludge and to realize a process that is more environment-friendly than known processes.

Remarkable advantages are achieved by the arrangement according to the invention. The new process makes use of such chemicals, for example sulfuric acid, that are normally used in an electrolytic copper refinery. The use of sulfuric acid in the treatment of anode sludge enables the recirculation of the solutions to electrolysis or to electrolytic solution purification. By means of the invention, a remarkable reduction is achieved as regards environmental emissions, because harmful gas emissions released from the Doré smelting are avoided. The total process delay is cut from 5-6 days to 3-4 days. The recirculation of silver back to the process is reduced, being less than 5%. Also the recovery of gold is improved. In addition, a hydrometallurgical process according to the invention does not require the grinding of silver bearing sludge prior to the silver leaching step.

The method according to the invention for processing anode sludge comprises the following steps: atmospheric leaching of anode sludge for separating copper and impurities; two-step calcination of the sludge for separating selenium, and for sulfatizing silver and some other metals; leaching of the calcinated sludge into a neutral aqueous solution for leaching silver sulfate, and separation of silver from the aqueous solution. Further, the leaching residue obtained from aqueous leaching is advantageously processed as follows: the leaching residue obtained from aqueous leaching is leached into sulfuric acid for separating impurities; the leaching residue from sulfuric acid leaching is leached into hydrochloric acid for leaching and separating precious metals; gold and platinum metals are separated from the hydrochloric acid solution; the leaching residue from hydrochloric acid leaching is treated by sulfuric acid for leaching residual silver, and the chloride solution is processed.

The invention is described in more detail below with reference to the appended drawing.

FIG. 1 represents a process diagram of the hydrometallurgical treatment of anode sludge according to the invention.

The raw material 10 of the method according to the invention is an alloy containing copper, precious metals and as impurities other metals and elements, such as selenium. Advantageously the employed raw material 10 is anode sludge obtained from the electrolytic refining of copper, and the composition of said raw material can vary. The copper content of the raw sludge can be over 30%. The silver and selenium content of one such sludge is typically about 10%, and its impurity contents (As, Sb, Bi, Pb, Te, Ni) are of the order of a few percent.

Copper is separated from the raw sludge 10 in atmospheric leaching. The leaching is carried out at normal pressure, at a raised temperature, which is 80-100° C., preferably 95-100° C., in a sulfuric acid solution and in the presence of oxygen. The employed oxygen source can be air or advantageously oxygen gas. When using oxygen, a better heat balance is reached, and less gases that must be exhausted are created in the reactor. Because in the arrangement according to the invention it is not necessary to remove all copper before calcination, mild conditions can be applied in the leaching of copper, and the leaching need not be carried out in an autoclave. Apart from copper, in atmospheric leaching also arsenic, tellurium and the major part of the chloride are dissolved from the anode sludge.

After leaching, the solution is filtered and the filtrate 17 is conducted back to the electrolytic plant. The filtered anode sludge 11 coming from atmospheric leaching still contains copper, and after copper removal, the copper content can be even over 10%.

After copper removal, the sludge 11 is calcinated in a two-step calcination process, the first step essentially comprising the removal of selenium, and the second step essentially comprising the sulfatizing of metals.

In the first calcination step, selenium is preferably removed completely. Before the calcination proper, the sludge is dried and thereafter heated up to 450-600° C. and calcinated by air, so that there is created $SeO_2$ gas 18. In calcination for removing selenium as selenium oxide, in order to prevent oxidation, it is possible to use sulfur dioxide or a mixture of oxygen and sulfur trioxide in addition to air.

In the second calcination step, and advantageously in the calcination furnace after calcination and selenium removal, the sludge is sulfatized. The sulfatizing is carried out by means of a sulfatizing compound, advantageously by means of concentrated sulfuric acid, and at a temperature lower than in the first calcination step. According to an embodiment of the invention, the employed sulfatizing chemical was a mixture of sulfur dioxide and air. Gas mixed with oxygen can be used for intensifying the sulfatizing process. Advantageously the sulfatizing temperature is 350-450° C. According to an embodiment of the invention, sulfatizing is carried out by means of sulfur trioxide at underpressure, preferably at the temperature of 200-330° C. The purpose of sulfatizing is above all to sulfatize the silver contained in the sludge, but also other metals such as copper and nickel are sulfatized. In the end of the calcination and sulfatizing step, the excess sulfuric acid is volatilized, and the sludge is cooled. In this step, there is typically recovered 90-99% of the anode sludge selenium, and the purity of the selenium is over 99.5%.

The selenium-free sulfatized sludge 12 is conducted to aqueous leaching, where the sludge is leached in a neutral aqueous solution, preferably in water. The solution pH is lowered during the leaching process. When the pH is higher than 2.5, in practice only the silver, copper and nickel contained in the sludge are dissolved.

In the aqueous leaching, the silver of the calcine is dissolved typically completely in water in about an hour. The solubility of the sludge is enhanced by the rapid breaking of the sludge particles in the solution. The breaking and thus also dissolution is enhanced by the highly soluble sulfates, such as copper sulfate, contained in the sludge. Before the aqueous leaching, the sludge copper content is preferably 3-12%. The aqueous leaching is carried out at a raised temperature, at a temperature of 80-100° C. The silver content in the aqueous solution is about 4 g/l.

The filtered solution 19 is conducted to the silver separation step. Silver can be simply cemented by copper to a pure silver powder 23. In the cementing process, it is advantageous to use a copper bar or plate and to keep the solution flow on the copper surface sufficiently high. After cementing, the solution 22 containing copper and nickel can be conducted back to the electrolytic plant. Instead of cementing, silver can also be separated by extracting it with a suitable reagent, or by electrolysis.

The leaching residue from aqueous leaching contains all of the gold and platinum metals of the original anode sludge. According to an embodiment of the present invention, the sludge is after aqueous leaching treated with concentrated sulfuric acid for removing impurities. In that case the leaching residue 13 is conducted to sulfuric acid leaching, where the sulfuric acid content in the solution is preferably over 400 g/l, and where the major part of the tellurium and part of other impurities, such as arsenic, can be leached away. Also silver residues are dissolved. The filtered solution 20 is conducted to the separation of tellurium. Tellurium is separated from the filtrate by cementing with copper into $Cu_2Te$ 25. Of the tellurium contained by the anode sludge, 96% is recovered in this step. Also the silver left in the solution can be cemented by means of copper powder or copper chips. The remaining solution 24 is conducted to further treatment, to the solution purification of copper electrolysis.

The leaching residue 14 obtained from sulfuric acid leaching is conducted to hydrochloric acid leaching, where the residue is leached by means of hydrochloric acid and an oxidizing agent, such as hydrogen peroxide or chlorine. The leaching temperature is 70-85° C., preferably 78-82° C. The content of the hydrochloric acid is 150-250 g/l, preferably 180-210 g/l. The leaching time is 1-2 hours. In this step all precious metals go to the solution. Also impurities, such as bismuth and lead, are dissolved. Among these, the solubility of lead chloride is more limited, depending, among others, on the temperature and the acid content. After leaching, the mixture is cooled and filtered. The filtrate 21 is conducted to a gold reduction step. Gold is advantageously reduced by treating the filtrate with $SO_2$ gas, so that gold is precipitated in two steps. In the first step, there is precipitated pure gold 26. The impure gold obtained from the second step is conducted back to the hydrochloric acid leaching.

As an alternative, gold can also be separated from the hydrochloric acid solution by dibutyl carbitol extraction. From the extraction solution, gold can be directly reduced to gold powder. In comparison with the extraction process, the precipitation of gold by $SO_2$ gas is a more economic and simple method for separating gold. In the extraction process, also part of the antimony, tellurium and arsenic are transferred to the extraction solution. In that case the purity of the reduced gold can suffer.

After reducing the gold, the filtrate 27 containing platinum group metals is conducted to the separation of platinum group metals (PGM). Platinum group metals are cemented by iron, so that there is obtained a mixture 28 containing platinum group metals. The filtrate 29 is processed and the processed solution 30 is conducted back to hydrochloric acid leaching. Impurities, such as arsenic, antimony, bismuth, tellurium and lead can be precipitated from the solution for example by lye.

The solid matter 15 obtained from the hydrochloric acid leaching contains lead sulfate, lead chloride, barium sulfate and a certain amount of silver chloride and antimony. This residue can be treated by concentrated sulfuric acid for leaching the silver residue. The obtained acid solution 16 can be further used in the selenium calcination furnace, as a silver sulfatizing reagent.

In case the silver sulfatizing was not fully successful in the process calcination, also silver is dissolved, apart from impurities, in the sulfuric acid leaching of the sludge. For leaching all of the silver, the sludge is leached in concentrated sulfuric acid. Silver can be separated from the sulfuric acid solution by extraction (the employed extraction reagent being for instance Cyanex 471X), and by reducing the silver directly from the extraction reagent by a suitable reducing agent. Before the extraction step, the solution must be diluted with respect to sulfuric acid. After silver separation, the process of this embodiment continues as the cementing of tellurium, whereafter the solution is returned to the solution purification of copper electrolysis.

The leaching residue from the hydrochloric acid leaching must be treated, if the silver sulfatizing was not fully successful in the calcination, and only neutral leaching was carried out for the sludge. In that case the silver of the leaching residue can be leached either in concentrated sulfuric acid or in a calcium chloride solution. The sulfuric acid solution can be returned to the calcination step. From the calcium chloride solution, silver can be separated as silver chloride and/or it can be reduced directly into silver.

REFERENCE EXAMPLE

In the experiment, there was treated anode sludge collected from the copper electrolysis of Outokumpu Pori Works. Usually anodes are leached for 16 days, during which time there are grown two sets of cathodes, the growing cycle being 8 days. Normally the anode sludge is collected from the tanks at an interval of 16 days, i.e. when the anodes are replaced. In this experiment, anode sludge was obtained from industrial-scale copper electrolysis by washing the anode sludge of the first anode cycle away from six electrolytic tanks already after 8 days, and by collecting the sludge for the test only from the second growing cycle, from the same tanks. The total amount of collected sludge was roughly 80 kg.

First the anode sludge was leached in atmospheric leaching for partially leaching the copper contained in the sludge. The leaching was carried out in a reactor of 1 m$^3$, the leach density being about 100 g dry matter/l. At the beginning of the leaching process, the acid content was 250 g H$_2$SO$_4$/l, and the leaching temperature was 95-100° C. The employed oxidizing agent was oxygen, and the total leaching time was 8 hours. In the end of the leaching process, the non-dissolved sludge was separated by filtering.

After atmospheric leaching, the separated sludge was calcinated in an industrial-scale calcination furnace for removing selenium, and for sulfatizing silver. The calcination was carried out in one step, and the employed calcination reagents were sulfur dioxide and oxygen. The total calcination time was 12 hours, and sulfur dioxide was fed for the duration of 4 hours at the beginning of the calcination process. The calcination temperature was 450-550° C.

The composition of the calcinated sludge was analyzed, and the obtained results were as follows: Ag=15.4%, Cu=8.1%, Ni=2.2%, As=2.2%, Sb=1.3%, Bi=5.0%, Se=0.08% and Te=1.0%.

The silver of the calcinated sludge was leached into water in a 10 liter reactor that was provided with a mixer and flow baffles. The quantity of the employed sludge was 350 g, and it was leached into water without grinding. The leaching time in the experiment was 3 hours, and the temperature was 95° C. After leaching, the precipitate was separated from the solution by filtering.

The analysis of the separated silver sulfate solution was as follows: Ag=4.5 g/l, Cu=2.3 g/l, Se=0.5 mg/l and Te=0.5 mg/l. The solution pH was 2.5.

Silver was cemented from the aqueous solution by copper. The cementing was carried out on the surface of a rotating copper cylinder, and the rotation speed of the cylinder could be adjusted. The solution volume in the cementing process was 500 ml, the solution temperature was 80° C., and the rotation speed of the cylinder was 2000 rpm. The initial solution was the aqueous solution obtained above, and consequently its silver content was 4.5 g Ag/l. At this speed of rotation, the silver precipitate was stripped from the copper surface in small particles and was settled on the bottom of the reactor used in the process.

The cementing time was 1 hour, and the analysis of the final solution was as follows: Ag=0.10 mg/l, Cu=8.6 g/l, Se=0.4 mg/l, Te<0.3 mg/l. The purity of silver was 99.9%.

The leaching of the leaching residue from the aqueous leaching was continued for leaching all of the silver, so that the leaching residue was leached into concentrated sulfuric acid (98%). The slurry density in the leaching process was 300 g/l, the temperature was 220° C. and the leaching time was 3 hours. For enhancing the filtering capacity, the sulfuric acid was after leaching diluted to 70%, and the leaching residue was filtered away from the acid solution. The final solution quantity was 1.5 liters. The analysis of the obtained sulfuric acid solution was as follows: Ag=4.1 g/l, As=4.9 g/l, Bi=2.3 g/l and Te=2.2 g/l.

Silver recovery in the aqueous leaching was 83.5% and in the sulfuric acid leaching 11.4%, while the total recovery was 94.9%.

EXAMPLE

In this experiment, anode sludge was treated by the method according to the invention. Anode sludge was collected as in the reference example. Because the point of time of the collection was different than in the reference example, the sludge analysis is somewhat different from that of the sludge of the reference example, within the normal range of process fluctuation.

Sludge was leached in atmospheric leaching in a laboratory-scale reactor having a volume of 8 l. The reactor was provided with a mixer and flow baffles. The leaching conditions were as follows: slurry density 250 g/l, sulfuric acid content in the beginning 250 g/l, leaching temperature 95-100° C., leaching time 7 hours and oxygen feed 40 l/h. In the end of the leaching process, the sludge was separated by filtering, and the obtained sludge was analyzed. The sludge analysis was as follows: Ag=11.5%, Cu=19.3%, Ni=1.0%, As=3.5%, Sb=1.7%, Bi=5.2%, Se=14.8% and Te=3.7%.

The dry sludge was subjected to two-step selenium calcination and silver sulfatizing in a laboratory-scale calcination furnace. The quantity of the employed sludge was 449 g.

The calcination of selenium was carried out at the temperature 500° C., the calcination time being 6 hours. The employed calcination reagents were sulfur dioxide 25 l/h and oxygen 20 l/h. After the calcination of selenium, the sludge was cooled and weighed, and a quantity of concentrated sulfuric acid, being one and a half times the weight of the sludge, was added therein. The obtained sludge was further sulfatized in the same furnace, at a temperature of 330-350° C., for the duration of 1 hour. After cooling, the sludge was weighed and analyzed. The weight of the sludge was 531.5 g and the analysis was as follows: Ag=9.8%, Cu=16.2%, Ni=0.9%, As=2.5%, Sb=0.7%, Bi=4.4%, Se=0.14% and Te=3.1%.

Next the sludge was subjected to aqueous leaching, where 500 g sludge was leached in 10 liters of water at the temperature 95-100° C. The leaching time was 3 hours, and after leaching, the solution was separated from the precipitate by filtering. For washing the precipitate, there was used a small amount of water, which was then combined in the filtrate (final filtrate volume was 8 l). The analysis of the filtrate was as follows: Ag=4.6 g/l, Cu=8.0 g/l, Se=1 mg/l and Te=2 mg/l. The solution pH was 3.1.

The obtained leaching recovery of silver was 93.9% without a separate sulfuric acid leaching.

The cementing of silver was carried out at a temperature of 80° C. on a copper piece (surface area 0.4 $cm^2$) that was positioned in the middle of a tube having the diameter of 6 mm. The solution was conducted through the tube, so that at the copper piece, the flowing speed of the solution was 10 m/s. The precipitated silver precipitate was further treated by 50% hydrogen peroxide that was added in the solution for the quantity of 0.2 ml. Finally the silver precipitate was filtered away from the solution and washed thoroughly.

The analysis of the obtained silver precipitate was as follows: Cu=50 ppm, Te=12 ppm and Se=10 ppm, the rest of the impurities being less than 5 ppm. Thus the achieved purity for the silver was 99.99%.

For a man skilled in the art, it is obvious that the various embodiments of the invention are not restricted to those described above, but may vary within the scope of the appended claims.

The invention claimed is:

1. A hydrometallurgical method for separating valuable metals and impurities from anode sludge obtained from copper electrolysis and containing at least 30% copper, wherein the method comprises:
   (a) leaching the anode sludge at atmospheric pressure in a sulfuric acid solution in the presence of oxygen, at a temperature of 80-100° C. for dissolving some copper from the sludge while leaving silver, gold, platinum metals and residual copper in the sludge,
   (b) removing the copper solution from the sludge such that the copper content of the sludge is at least 3%,
   (c) calcinating the sludge in a first step for removing selenium as selenium dioxide and in a second step for sulfatizing silver and copper in the sludge,
   (d) leaching the sludge into a neutral aqueous solution for dissolving sulfatized silver and copper while leaving gold and platinum metals in the residue,
   (e) separating silver from the aqueous solution,
   (f) separating gold from the residue obtained from silver and copper leaching, and
   (g) separating platinum metals from the residue obtained from gold separation.

2. A method according to claim 1, wherein step (a) comprises leaching the anode sludge at a temperature of 95-100° C.

3. A method according to claim 1, wherein step (a) comprises leaching the anode sludge in the presence of air or oxygen gas.

4. A method according to claim 1, wherein the first calcination step comprises calcinating the sludge at a temperature of 450-600° C. for oxidizing selenium and for creating $SeO_2$ gas.

5. A method according to claim 4, wherein the first calcination step oxidizes the selenium using oxygen bearing gas.

6. A method according to claim 1, wherein the first calcination step oxidizes the selenium using oxygen bearing gas and sulfur dioxide.

7. A method according to claim 1, wherein the first calcination step oxidizes the selenium using oxygen and sulfur trioxide.

8. A method according to claim 1, wherein the second calcination step comprises calcinating with concentrated sulfuric acid.

9. A method according to claim 1, wherein the second calcination step is carried out in a calcination furnace after the first calcination step, at a lower temperature than the first calcination step.

10. A method according to claim 9, wherein the second calcination step is carried out at a temperature of 300-420° C.

11. A method according to claim 1, wherein step (d) comprises leaching at a temperature of 80-100° C.

12. A method according to claim 1, wherein step (e) comprises separating silver from aqueous solution by cementing with copper.

13. A method according to claim 12, comprising cementing silver with a copper bar or a copper plate, so that the solution flow on the copper surface is maintained high.

14. A method according to claim 1, wherein step (e) comprises separating silver from the aqueous solution by extraction.

15. A method according to claim 1, wherein step (e) comprises separating silver from the aqueous solution by electrolysis.

16. A method according to claim 1, comprising leaching the leaching residue of step (a) into sulfuric acid for leaching and separating impurities.

17. A method according to claim 16, wherein the sulfuric acid content is at least 400 g/l.

18. A method according to claim 1, comprising separating valuable metals of the sludge from the leaching residue after neutral leaching by leaching into hydrochloric acid by means of an oxidizing agent and separating gold from the solution by reducing the gold and the platinum metals.

19. A method according to claim 18, comprising treating the leaching residue from chloride leaching with concentrated sulfuric acid.

20. A method according to claim 19, comprising using the acid solution from leaching with concentrated sulfuric acid as a silver sulfatizing agent in the second calcination step.

21. A method according to claim 18, comprising separating gold by reducing with $SO_2$ gas.

22. A method according to claim 18, comprising separating gold by extracting with dibutyl carbitol.

23. A method according to claim 18, comprising separating platinum group metals from the hydrochloric acid solution by cementing with iron.

24. A method according to claim 1, wherein after step (b) the copper content of the sludge is at least 10%.

* * * * *